United States Patent [19]

Stockton

[11] Patent Number: 4,505,350

[45] Date of Patent: Mar. 19, 1985

[54] DRIVE SYSTEM FOR AUTOMOTIVE POWER STEERING PUMP

[75] Inventor: Thomas R. Stockton, Ann Arbor, Mich.

[73] Assignee: Ford Motor Company, Dearborn, Mich.

[21] Appl. No.: 451,694

[22] Filed: Dec. 20, 1982

[51] Int. Cl.³ .............................................. B62D 5/02
[52] U.S. Cl. ..................................... 180/143; 60/384; 74/388 PS; 74/665 B; 74/705; 417/223
[58] Field of Search .................... 180/143, 141, 693; 74/665 B, 714, 388 PS, 705; 60/384; 417/15, 223

[56] References Cited

U.S. PATENT DOCUMENTS

| 2,146,687 | 2/1939 | Regan | 74/705 |
| 2,760,590 | 8/1956 | Stolte | 180/143 |
| 3,085,645 | 4/1963 | Bookout et al. | 180/143 |

Primary Examiner—Joseph F. Peters, Jr.
Assistant Examiner—Mitchell J. Hill
Attorney, Agent, or Firm—Frank G. McKenzie; Donald J. Harrington

[57] ABSTRACT

The shaft of a hydraulic pump for an automotive power steering system is driven through an overrunning clutch from a planetary pinion carrier. The sun gear of the gearset is connected to a portion of the driveline that drives the wheels of the vehicle and the ring gear is connected to the engine shaft. The sun gear turns opposite the direction of the ring gear and the speed of the pump varies inversely with the vehicle speed.

8 Claims, 3 Drawing Figures

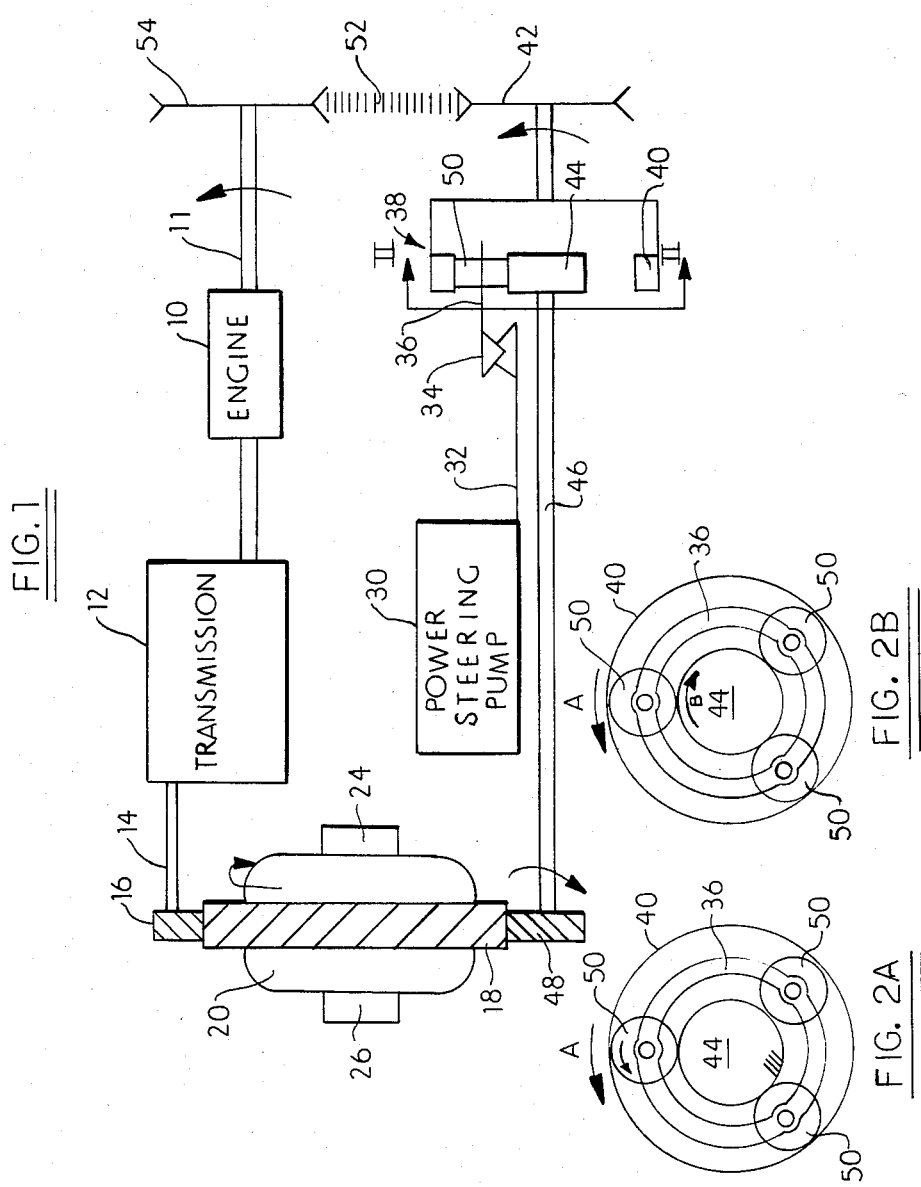

DRIVE SYSTEM FOR AUTOMOTIVE POWER STEERING PUMP

BACKGROUND OF THE INVENTION

1. Field of the Invention

This invention relates to the field of automotive power steering systems and, more particularly, pertains to a system for driving a power steering pump at a variable speed concurrently from the engine and from the transmission output.

2. Description of the Prior Art

An automotive power steering system usually includes a hydraulic pump and a control valve connected to the discharge side of the pump, which directs pressurized hydraulic fluid at a specific flow rate to the right or left-hand portions of the power steering gear depending upon the direction that the steering wheel of the vehicle is turned by the operator. Several kinds of hydraulic pumps are used in such systems including sliding vane, slipper or gerotor types; these usually are belt-driven from the engine shaft and adapted to produce a volumetric flow rate that varies in proportion to the speed of the engine. The flow capacity of the pump is determined with the engine idling, the wheels of the vehicle stopped and the steering wheel being turned at a fast rate of speed. The flow capacity of the pump established during these conditions is the capacity sufficient to keep the power steering system pressurized and simulates the frequently occurring parking maneuver operating condition. However, at highway speed, the pump produces a flow rate substantially greater than that required in the idle speed condition and may, at the higher engine speeds, produce a flow rate that is several times greater than the idle speed flow rate. This excess flow capacity is returned to a hydraulic fluid sump which is open to the inlet side of the pump for recirculation. There is, therefore, associated with this conventional power steering system a considerable loss of efficiency when the engine is operating at speeds greater than the idle speed. It is preferable that a power steering system actually produce less flow as the engine speed increases because as a practical matter at highway speeds, the steering wheel of the vehicle can be turned safely through only a small angle, otherwise the vehicle is subjected to the possibility of roll-over.

SUMMARY OF THE INVENTION

The system according to the present invention transmits power to the hydraulic pump of an automotive power steering system through a gearset having a first input element driveably connected to the engine shaft preferably by way of a belt pulley system. The gearset has a second input element which is driven at a speed that is proportional to the speed of the wheels of the vehicle.

In one embodiment of the present invention, the ring gear of a front wheel drive transaxle differential drives a pinion which is driveably connected to the sun gear of the gearset. The gearset may be a simple planetary system that includes a ring gear driven from the engine shaft, a sun gear driven from the differential, a planet carrier and multiple planetary pinions rotatably mounted on the carrier meshing with the ring gear and the sun gear. The carrier is connected to the pump shaft either directly or through a one-way clutch. When the vehicle is standing at idle, the sun gear, which is fixed because the wheels are stationary, provides a torque reaction for the gearset through which power is transmitted from the ring gear to the planet carrier and to the pump shaft. The drive ratios of the belt pulley system, of the differential-pinion combination and of the gearset can be established such that the pinion carrier is not driven when the transmission is operating at any of the forward drive ratios higher than the lowest drive ratio. Maximum pump capacity is established, as usually it is, to accommodate the necessary parking maneuvers with the vehicle standing at idle. However, as the vehicle accelerates in first gear, the rotational speed of the pump gradually diminishes because both input elements of the gearset are driven, the sun gear driven in an opposite sense of direction from that of the ring gear. Eventually a point can be reached when the planetary carrier and the pump shaft are not turning.

A power steering system made according to this invention realizes an improved fuel economy by providing the maximum power steering pump flow capacity only when the vehicle is standing at idle and lower pump capacity as the vehicle increases road speed. Proportions of the gearing and the pulley drive system can be adjusted to cause the pump to cease rotation in a forward drive ratio greater than that of the low speed ratio. This drive system is particularly well adapted for use with front-wheel drive vehicles in which the transmission and differential are located adjacent the engine.

BRIEF DESCRIPTION OF THE DRAWING

FIG. 1 is a schematic diagram showing the system according to this invention.

FIGS. 2a and 2b show schematically the gearset, viewed in direction II—II of FIG. 1, in two different operating conditions.

DESCRIPTION OF THE PREFERRED EMBODIMENT

Referring to FIG. 1, a front wheel drive automotive vehicle normally has its engine 10 arranged such that its shaft 12 is directed transversely. The transmission 12 driven from the engine has its output shaft 14 disposed parallel to the engine crankshaft. The output gear 16 of the transmission is in mesh with a ring gear 18 of the differential 20 through which power is transmitted to the front axleshafts 24 and 26.

The hydraulic pump 30 of a power steering system is connected by a shaft 32 and an overrunning clutch 34 to the planetary pinion carrier 36 of an epicyclic gearset shown generally at 38. The gearset includes a ring gear 40 driveably connected to a driven pulley 42, a sun gear 44 driveably connected by shaft 46 to a power steering torque reaction pinion 48 that is in continuous meshing engagement with the differential ring gear 18. A set of planetary pinions 50 are rotatably mounted on pinion carrier 36 and are in continuous meshing engagement with the ring gear and the sun gear. A flexible endless belt 52 is driveably mounted on pulley 42 and on a second pulley 54, which is mounted on the engine shaft 11. Power from the engine is transmitted through the belt and pulleys to the ring gear of the gearset 38.

When the vehicle is stationary and the engine is turning at idle speed, the sun gear provides a torque reaction for the gearset because the wheels of the vehicle hold the axleshafts stationary and these are driveably connected to ring gear 18. Pinion 48 meshing with ring gear 18 is connected by shaft 46 to the sun gear. In this condition the ring gear is driven counterclockwise as shown in FIG. 2a and the planetary pinions rotate counterclockwise on their axes and revolve about the axis of the gearset on the stationary gear teeth of sun gear 44. In this way the carrier 36 is made to rotate counterclockwise and the power steering pump is driven in this direction. The pump capacity is sized such that the requirements of the power steering system are adequately supplied with the flow rate produced by the pump at this standing idle condition.

As the vehicle accelerates in first gear, pinion 48, shaft 46 and sun gear 44 are turned in the direction of vector B as shown in FIG. 2b and ring gear 40 turns in the direction indicated by vector A. Depending on the relative speeds of the sun gear and ring gear, the planetary carrier 36 is driven counterclockwise at a slower speed than the standing idle speed. The proportions of the gearing and the pulley drive system can be adjusted such that the pump shaft 32 and carrier 36 are not rotating. Preferably the gear ratio in which the pump shaft is not driven is the second forward speed ratio or a higher speed ratio greater than the second, but the speed ratio in which pump rotation stops may be any of the forward speed ratios.

In this way it can be seen that the flow capacity of the pump is never greater than the capacity produced when the vehicle is stationary and the engine at idle speed. As road speed increases toward highway speeds, the flow rate of the pump decreases continuously as vehicle speed increases and the system can be so designed that the pump produces no output at a particular forward speed condition. Overrunning clutch 34 assures that pump 30 is driven from the planet carrier in one direction only.

Having described a preferred embodiment of my invention what I claim and desire to secure by U.S. Letters Patent is:

1. A system for driving an automotive power steering pump from an engine comprising:
    a hydraulic pump;
    gearing means having first and second input elements driveably connected to an output element which is connected to the pump;
    means for driveably connecting the engine shaft to the first input element; and
    means for driving the second input element at a speed that varies with the speed of the vehicle wheels such that the speed of the output element and of the pump decreases as vehicle speed increases.

2. The system of claim 1 further comprising an overrunning clutch providing a one-way driving relationship between the pump shaft and the output element of the gearing means.

3. The system of claim 1 wherein the gearing means includes:
    a ring gear connected to the engine shaft;
    a sun gear connected to the driving means rotating opposite the direction of the ring gear; and
    a set of planetary pinions driveably engaged with the sun gear and with the ring gear and rotatably mounted on a carrier that is connected to the pump shaft.

4. The system of claim 1 wherein the gearing means includes:
    a ring gear connected to the driving means;
    a sun gear driven from the engine and rotating opposite the direction of the ring gear; and
    a set of planetary pinions driveably engaged with the sun gear and with the ring gear and rotatably mounted on a carrier that is connected to the pump shaft.

5. The system of claim 1 wherein the connecting means includes a first pulley driven from the engine shaft, a second pulley connected to the first input element of the gearing means, and a drive belt that driveably engages the first and second pulleys.

6. The system of claim 1 wherein the driving means includes a differential mechanism driven from the transmission through which power is transmitted to the drive wheels of the vehicle and means driveably connecting the differential mechanism to the second input element of the gearing means.

7. A system for driving an automotive device, such as a power steering pump, for varying the speed of the device inversely with the vehicle speed comprising:
    gearing means having first and second driven members and an output member driveably connected to the driven members and to the device;
    means driveably connecting the engine shaft to the first driven member of the gearing means; and
    means for driving the second driven member of the gearing means at a speed that varies with the speed of the vehicle wheels such that the speed of the output member decreases as the vehicle speed increases.

8. The system of claim 7 wherein the second driven member turns opposite the direction of the first driven member.

* * * * *